(12) United States Patent
Sendai

(10) Patent No.: US 7,230,262 B2
(45) Date of Patent: Jun. 12, 2007

(54) RADIATION IMAGE RECORDING AND READ-OUT SYSTEM AND PROGRAM FOR THE SAME

(75) Inventor: Tomonari Sendai, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 85 days.

(21) Appl. No.: 11/141,327

(22) Filed: Jun. 1, 2005

(65) Prior Publication Data
US 2005/0263730 A1    Dec. 1, 2005

(30) Foreign Application Priority Data
Jun. 1, 2004    (JP)    ............... 2004-163058

(51) Int. Cl.
*G03B 42/08*    (2006.01)
(52) U.S. Cl. ...................................... 250/583
(58) Field of Classification Search ............. 378/95; 250/583
See application file for complete search history.

(56) References Cited

U.S. PATENT DOCUMENTS 6,560,309 B1 * 5/2003 Becker et al. ................ 378/8
6,937,696 B1 * 8/2005 Mostafavi ................. 378/95
7,050,537 B2 * 5/2006 Tsujii ........................ 378/95

FOREIGN PATENT DOCUMENTS

| WO | WO 94/17733 A1 | 8/1994 |
| WO | WO 00/35346 A2 | 6/2000 |

* cited by examiner

*Primary Examiner*—Constantine Hannaher
(74) *Attorney, Agent, or Firm*—Sughrue Mion, PLLC

(57) ABSTRACT

Reference image signals representing at least two reference images of different phases of an object, whose phase varies within a predetermined variation range, are stored. Successive image recording operations are performed on the object, whose phase is varying within the predetermined variation range, with a low radiation dose and at predetermined time intervals, and successive recorded images are acquired. The phase of the object is detected for each of the successive recorded images and in accordance with the reference images of the different phases of the object. When the detected phase of the object coincides with a desired phase, an ordinary image recording operation with an ordinary radiation dose is performed.

5 Claims, 6 Drawing Sheets

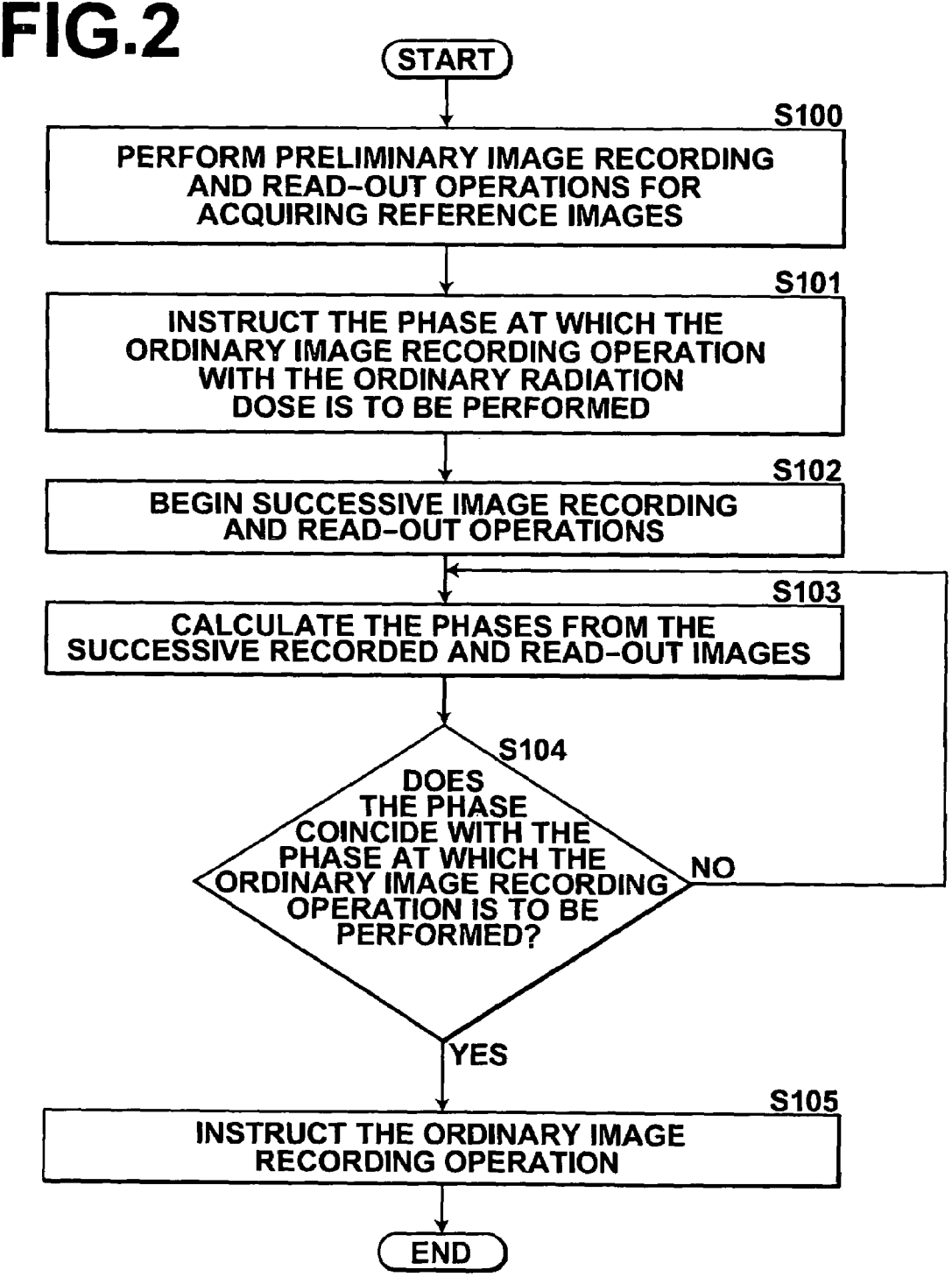

FIG. 3A MAXIMUM DISPLACEMENT
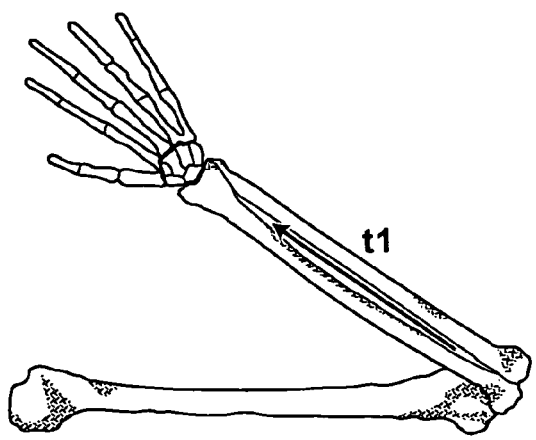
FIG. 3B MINIMUM DISPLACEMENT
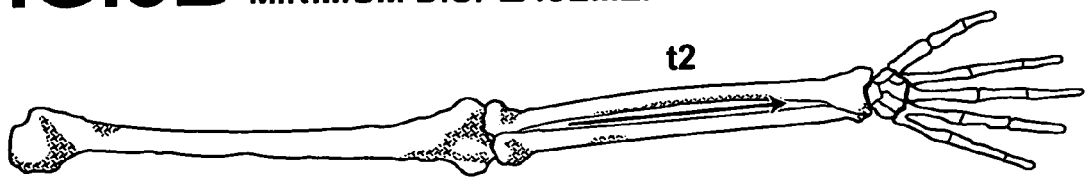
FIG. 4
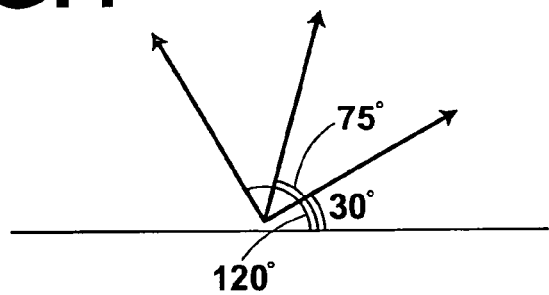

80% DISPLACEMENT

MINIMUM DISPLACEMENT

RADIATION IMAGE RECORDING AND READ-OUT SYSTEM AND PROGRAM FOR THE SAME

BACKGROUND OF THE INVENTION

1. Field of the Invention

This invention relates to a radiation image recording and read-out system, in which dynamic image recording and read-out operations are performed with X-rays, or the like. This invention also relates to a computer program for the radiation image recording and read-out system.

2. Description of the Related Art

An arthrosteitis is an ordinary symptom that adversely affects a joint of a human. The arthrosteitis constitutes a principal cause of a pain at the time of motions and a motion failure. Particularly, the arthrosteitis of a knee often occurs with persons of middle age and advanced age.

However, in spite of the frequent occurrence of the arthrosteitis, little information is available with respect to factors for the advance of the arthrosteitis. In particular, it has heretofore been considered that there is no technique for the degeneration disease due to wear and loss. However, recently, it is often regarded that there is possibility of the arthrosteitis being treated with pharmaceutical or surgical treatment utilizing cartilage transplantation, bone resection, tibial corticectomy, and the like. However, whether a treatment technique for the arthrosteitis is or is not capable of being selected appropriately depends upon a technique for evaluating the condition of a joint of a patient and a degeneration process. Therefore, it is necessary to develop a technique for investigating factors, which affect the advance of the arthrosteitis and a technique for quantitative determination of the advance of the arthrosteitis. Particularly, it has been found that kinetic loads have relations with the advance of the arthrosteitis. Accordingly, information concerning relations with a load region in a motion cycle is markedly important for the evaluation of the factors, which affect the advance of the arthrosteitis.

Also, a joint is constituted of cartilages and accompanying bones, which are located on opposite sides of the joint. Therefore, for the evaluation of the condition of the joint, there has been proposed a technique for acquiring information concerning the load region from a joint motion pattern and a joint cartilage degeneration pattern by use of magnetic resonance images (MRI), CT images, and the like. Specifically, there has been proposed a technique, wherein relationship between the joint motion pattern and the joint cartilage degeneration pattern is acquired from a comparison of the joint motion pattern and the joint cartilage degeneration pattern with each other, external markers are located on the skin at the accompanying bone for detection of the joint motion pattern, and the joint motion pattern is acquired with the passage of time from movements of the external markers. (The technique described above is proposed in, for example, International Patent Publication No. WO/00/035346.)

The technique utilizing the magnetic resonance images (MRI) is a markedly accurate technique for visualizing the joint cartilage suffering from the arthrosteitis at, particularly, a knee region. In particular, for kinetic analyses of knee joints, a kinetic MRI technique, or the like, has heretofore been utilized for examinations.

However, in the cases of the CT examinations and the MRI examinations, a long time is required for reservations, or the like, before the persons to be examined become capable of undergoing the examinations, and the examination cost is not capable of being kept low. If the kinetic analyses are capable of being performed as screening examinations, the examinations will be capable of being conducted markedly efficiently.

Therefore, currently, as kinetic examination modalities, flat panel detectors (FPD's) adapted to dynamic images are considered to be promising. In cases where the FPD's adapted to dynamic images are utilized, there is a high possibility that the kinetic analyses will be performed easily as in the cases of the ordinary X-ray examinations. Accordingly, the FPD's adapted to dynamic images are capable of being utilized for the screening examinations.

In cases where the X-ray image recording operations aiming at the kinetic analyses described above are to be performed, for example, successive image recording operations are performed at a frame rate ranging from approximately 3 fps (frames per second) to approximately 30 fps. Also, kinetic analyses are made in accordance with the acquired images, and diagnoses are made in accordance with the results of the kinetic analyses. However, with the image recording techniques aiming at the kinetic analyses described above, the following problems are encountered:

An image of the joint at a desired position is not capable of being recorded due to the manner of movement of the joint of the person to be examined.

Since the successive image recording operations are performed at a predetermined frame rate, it often occurs that an image of the object at a required position is not capable of being acquired, and it becomes necessary for the image recording operations to be performed again.

Further, if the successive image recording operations are performed by use of ordinary radiation doses, with which the images of the object are capable of being recorded clearly, the total radiation dose delivered to the person to be examined will become high. Therefore, it is desired that the image recording operation with the ordinary radiation dose is capable of being performed only at the time at which the position of the object coincides with a required position.

SUMMARY OF THE INVENTION

The primary object of the present invention is to provide a radiation image recording and read-out system, wherein dynamic image recording and read-out operations are performed with X-ray image recording and read-out operations, or the like, such that an image of an object is capable of being recorded and read out at the time at which the state of the object coincides with a desired state.

Another object of the present invention is to provide a computer program for the radiation image recording and read-out system.

The present invention provides a radiation image recording and read-out system, comprising:

i) image recording and read-out means for performing radiation image recording and read-out operations on an object, whose phase varies within a predetermined variation range, ii) storage means for storing reference image signals, which represent at least two reference images of different phases of the object, the at least two reference images of the different phases of the object having been acquired with the radiation image recording and read-out operations performed on the object, whose phase varies within the predetermined variation range, iii) successive image recording and read-out instructing means for giving an instruction to the image recording and read-out means such that the image recording and read-out means performs successive image recording and read-out operations on the object, whose phase is varying within the predetermined variation range, the successive image recording operations being performed by use of a low radiation dose and at predetermined time intervals, a plurality of successive recorded and read-out images being acquired from the successive image recording and read-out operations, iv) phase detecting means for detecting the phase of the object with respect to each of the successive recorded and read-out images, which have been acquired with the image recording and read-out means and in accordance with the instruction given by the successive image recording and read-out instructing means, the phase detection being made in accordance with the reference images of the different phases of the object, and v) ordinary image recording and read-out instructing means for giving an instruction to the image recording and read-out means at the time, at which the detected phase of the object having been detected by the phase detecting means coincides with a desired phase of the object, such that the image recording and read-out means performs ordinary image recording and read-out operations on the object, the ordinary image recording operation being performed by use of an ordinary radiation dose.

The present invention also provides a computer program, comprising the procedures for causing a computer to function as:

i) storage means for storing reference image signals, which represent at least two reference images of different phases of an object, the at least two reference images of the different phases of the object having been acquired with radiation image recording and read-out operations performed by image recording and read-out means and on the object, whose phase varies within a predetermined variation range, ii) successive image recording and read-out instructing means for giving an instruction to the image recording and read-out means such that the image recording and read-out means performs successive image recording and read-out operations on the object, whose phase is varying within the predetermined variation range, the successive image recording operations being performed by use of a low radiation dose and at predetermined time intervals, a plurality of successive recorded and read-out images being acquired from the successive image recording and read-out operations, iii) phase detecting means for detecting the phase of the object with respect to each of the successive recorded and read-out images, which have been acquired with the image recording and read-out means and in accordance with the instruction given by the successive image recording and read-out instructing means, the phase detection being made in accordance with the reference images of the different phases of the object, and iv) ordinary image recording and read-out instructing means for giving an instruction to the image recording and read-out means at the time, at which the detected phase of the object having been detected by the phase detecting means coincides with a desired phase of the object, such that the image recording and read-out means performs ordinary image recording and read-out operations on the object, the ordinary image recording operation being performed by use of an ordinary radiation dose.

The term "ordinary radiation dose" as used herein means the radiation dose which is higher than the low radiation dose that is employed in the successive image recording and read-out operations. The ordinary radiation dose should preferably be set at a dose optimum for the image of the object to be seen appropriately.

The object, whose phase varies within the predetermined variation range, may be, for example, an arm, which is capable of being moved within the range from a maximum bent position to a stretched position. Alternatively, for example, the object, whose phase varies within the predetermined variation range, may be the heart, which moves within the range from a maximum diastolic phase and a minimum systolic phase.

The radiation image recording and read-out system in accordance with the present invention should preferably be modified such that the reference images of the different phases of the object are the images of a maximum displacement and a minimum displacement within the predetermined variation range described above.

The term "maximum displacement" and the term "minimum displacement" as used herein mean the opposite ends of the predetermined variation range.

Also, the radiation image recording and read-out system in accordance with the present invention may be modified such that the object is provided with markers having predetermined radiation absorbing characteristics, and the phase detecting means makes the phase detection in accordance with positions of marker image patterns, which are embedded in the reference images and the successive recorded and read-out images.

The term "markers having predetermined radiation absorbing characteristics" as used herein means the markers having the radiation absorbing characteristics such that the image patterns of the markers are recorded with contrast different from the contrast of the object. The markers may be constituted of pieces of a metal, such as lead, or fine vessels containing a marker material.

With the radiation image recording and read-out system in accordance with the present invention, the successive image recording and read-out operations are performed on the object, whose phase is varying within the predetermined variation range, or the object, which is moving periodically, the successive image recording operations being performed by use of the low radiation dose and at the predetermined time intervals, the plurality of the successive recorded and read-out images being acquired from the successive image recording and read-out operations. Also, the phase of the object with respect to each of the successive recorded and read-out images is detected. Further, the ordinary image recording and read-out operations are performed on the object at the time, at which the detected phase of the object coincides with the desired phase of the object, the ordinary image recording operation being performed by use of the ordinary radiation dose. Therefore, the ordinary image recording operation with the ordinary radiation dose is capable of being performed at the time at which the state of the object coincides with the desired state to be seen.

With the radiation image recording and read-out system in accordance with the present invention, wherein the reference images of the different phases of the object are the images of the maximum displacement and the minimum displacement within the predetermined variation range, the phase of the object is capable of being detected accurately.

The radiation image recording and read-out system in accordance with the present invention may be modified such that the object is provided with the markers having the predetermined radiation absorbing characteristics, and the phase detecting means makes the phase detection in accordance with the positions of the marker image patterns, which are embedded in the reference images and the successive recorded and read-out images. With the modification described above, calculations for the phase detection are capable of being made accurately.

BRIEF DESCRIPTION OF THE DRAWINGS

FIG. 2 is a flow chart showing how the embodiment of the radiation image recording and read-out system in accordance with the present invention operates, FIG. 3A is a schematic view showing an arm in the state of a maximum displacement, FIG. 3B is a schematic view showing the arm in the state of a minimum displacement, FIG. 4 is an explanatory diagram showing how a phase of the arm is calculated.

DESCRIPTION OF THE PREFERRED EMBODIMENTS

The present invention will hereinbelow be described in further detail with reference to the accompanying drawings.

Figure 1:
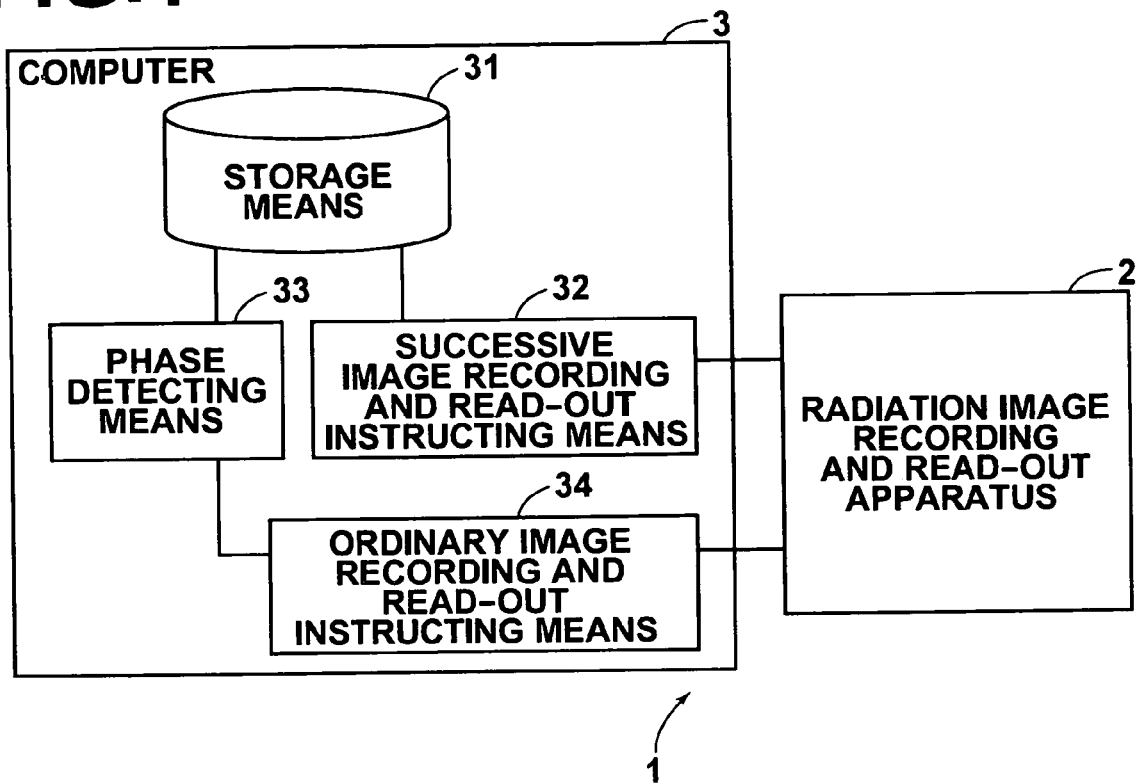
FIG. 1 is a block diagram showing an embodiment of the radiation image recording and read-out system in accordance with the present invention.

As illustrated in FIG. 1, a radiation image recording and read-out system 1, which is an embodiment of the radiation image recording and read-out system in accordance with the present invention, comprises a radiation image recording and read-out apparatus 2, which acts as the image recording and read-out means for performing X-ray image recording and read-out operations on an object. The radiation image recording and read-out apparatus 2 may be constituted of a computed radiography (CR) apparatus, or the like. The radiation image recording and read-out system 1 also comprises a computer 3 for controlling the image recording and read-out operations performed by the radiation image recording and read-out apparatus 2.

The computer 3 comprises storage means 31 for storing a reference image signal, which represents a reference image of the object in the state of a maximum displacement, and a reference image signal, which represents a reference image of the object in the state of a minimum displacement. The computer 3 also comprises successive image recording and read-out instructing means 32 for giving an instruction to the radiation image recording and read-out apparatus 2 such that the radiation image recording and read-out apparatus 2 performs successive image recording and read-out operations on the object, the successive image recording operations being performed by use of a low radiation dose and at predetermined time intervals, a plurality of successive recorded and read-out images being acquired from the successive image recording and read-out operations. The computer 3 further comprises phase detecting means 33 for detecting the phase of the object with respect to each of the successive recorded and read-out images and in accordance with the reference images of the different phases of the object. The computer 3 still further comprises ordinary image recording and read-out instructing means 34 for giving an instruction to the radiation image recording and read-out apparatus 2 at the time, at which the detected phase of the object coincides with a desired phase of the object, such that the radiation image recording and read-out apparatus 2 performs ordinary image recording and read-out operations on the object, the ordinary image recording operation being performed by use of an ordinary radiation dose.

The radiation image recording and read-out apparatus 2 is capable of performing the successive image recording and read-out operations. With the successive image recording operations, X-rays of a predetermined dose are irradiated from an X-ray tube to the object (i.e., a desired site of a person to be examined), whose phase is varying within a predetermined variation range, and the plurality of the images of the object are thereby recorded successively by use of a FPD adapted to dynamic images and at a frame rate ranging from approximately 3 fps to approximately 30 fps. Image signals, which represent the successive recorded and read-out images, are sent from the radiation image recording and read-out apparatus 2 to the computer 3.

The successive image recording and read-out instructing means 32 of the computer 3 gives the instruction to the radiation image recording and read-out apparatus 2 such that the radiation image recording and read-out apparatus 2 performs the successive image recording operations with the low radiation dose and at the predetermined frame rate. Also, the successive image recording and read-out instructing means 32 receives the image signals, which represent the successive recorded and read-out images, from the radiation image recording and read-out apparatus 2.

The ordinary image recording and read-out instructing means 34 of the computer 3 gives the instruction to the radiation image recording and read-out apparatus 2 at the time, at which the phase of the object coincides with the predetermined phase, such that the radiation image recording and read-out apparatus 2 performs the ordinary image recording operation on the object and by use of the ordinary radiation dose, which is optimum for the image of the object to be seen appropriately.

By way of example, the upper arm and the elbow of a person to be examined may be kept stationary, the lower arm of the person to be examined may be stretched and bent around the elbow joint acting as the axis of the movement, and the images of the arm may thereby be acquired. How the radiation image recording and read-out system 1 operates in such cases will be described hereinbelow with reference to FIG. 2.

Firstly, in a step S100, the radiation image recording and read-out apparatus 2 performs preliminary image recording and read-out operations. The preliminary image recording operations are performed by use of a low radiation dose. The preliminary image recording operations with the low radiation dose are performed in the state, in which the upper arm and the elbow of the person to be examined are kept stationary, and in which the lower arm of the person to be examined is bent to a maximum possible bent position as illustrated in FIG. 3A, and in the state, in which the upper arm and the elbow of the person to be examined are kept stationary, and in which the lower arm of the person to be examined is stretched as illustrated in FIG. 3B. The image of the arm in the state, in which the lower arm of the person to be examined is bent to the maximum possible bent position, is herein referred to as the image of the arm with the maximum displacement. Also, the image of the arm in the state, in which the lower arm of the person to be examined is stretched, is herein referred to as the image of the arm with the minimum displacement. The image signal, which represent the image of the arm with the maximum displacement, and the image signal, which represent the image of the arm with the minimum displacement, are sent to the computer 3 and are stored in the storage means 31 as the reference image signals representing the reference images.

Also, edge detection processing is performed on the reference image signals representing the two reference images. With the edge detection processing, edges of bone image patterns of the upper arm and the lower arm are detected by use of, for example, a differentiation filter, such as a Sobel filter or a Laplacian filter. From the edge detection processing, an image of the edges of the bone of the lower arm and an image of the edges of the bone of the upper arm are acquired. Since the image recording operations have been performed in the state, in which the positions of the upper arm and the elbow are fixed, the edges of the bone image pattern of the upper arm appear at identical positions in the two reference images. Therefore, in cases where the difference between the images of the bone edges, which images have been acquired from the two reference images, is calculated, images of the edges of the bone of the lower arm are capable of being extracted. Thereafter, the directions of the edges are detected from the thus extracted images of the edges of the bone of the lower arm. (The directions of the edges may be detected by use of, for example, a Hough transform for detecting a straight line.) In this manner, a direction t1 of the lower arm with the maximum displacement as illustrated in FIG. 3A and a direction t2 of the lower arm with the minimum displacement as illustrated in FIG. 3B are calculated.

The lower arm moves between the position with the maximum displacement and the position with the minimum displacement around the elbow. The phase of the lower arm is calculated in accordance with the direction of the lower arm with the maximum displacement and the direction of the lower arm with the minimum displacement, which directions are taken as reference directions. For example, as illustrated in FIG. 4, the angle of the lower arm with the maximum displacement may be equal to 120°, and the angle of the lower arm with the minimum displacement may be equal to 30°. In such cases, the state of the variation between the angle of 30° and the angle of 120° may be taken as one phase. In such cases, ½ phase of the lower arm represents the state in which the angle of the lower arm with respect to the upper arm is equal to 75°.

Before the image recording and read-out operations are begun, in a step S101, the operator instructs the phase of the lower arm at which the ordinary image recording operation with the ordinary radiation dose is to be performed. Specifically, the region between the maximum displacement and the minimum displacement, which region has been obtained from the reference images, is divided into, for example, 10 intervals, and the operator gives an instruction specifying an interval at which the ordinary image recording operation with the ordinary radiation dose is to be performed. The number of the intervals, into which the region between the maximum displacement and the minimum displacement is divided, may be set in accordance with the kind of the object, whose image is to be recorded.

In a step S102, the operator gives an instruction to the person to be examined such that the person to be examined bends and stretches the lower arm with the upper arm and the elbow being kept stationary. When the person to be examined begins the bending and stretching movements of the lower arm, the operator inputs an instruction for the beginning of the image recording and read-out operations into the computer 3. When the instruction for the beginning of the image recording and read-out operations is inputted into the computer 3, the successive image recording and read-out instructing means 32 sends a signal into the radiation image recording and read-out apparatus 2, such that the radiation image recording and read-out apparatus 2 performs the successive image recording and read-out operations at a predetermined frame rate. The radiation image recording and read-out apparatus 2 acquires successive recorded and read-out images at the predetermined frame rate. The image signals, which represent the successive recorded and read-out images, are sent successively from the radiation image recording and read-out apparatus 2 into the computer 3. In a step S103, with respect to each of the successive recorded and read-out images, the phase detecting means 33 extracts the edges of the bone image patterns of the arm (i.e., the upper arm and the lower arm) and calculates the direction of the edges of the bone of the lower arm. The phase detecting means 33 thus successively calculates the phases of the lower arm from the successive recorded and read-out images.

In a step S104, a judgment is made from the calculated phases of the lower arm in the successive recorded and read-out images as to whether the lower arm has or has not entered into the specified phase interval. In cases where it has been judged that the lower arm has entered into the specified phase interval, in a step S105, the ordinary image recording and read-out instructing means 34 gives an instruction to the radiation image recording and read-out apparatus 2 such that the radiation image recording and read-out apparatus 2 performs the ordinary image recording operation with the ordinary radiation dose. Actually, in accordance with the speed at which the person to be examined moves the lower arm, a deviation occurs between the time, at which the lower arm comes into a certain phase, and the time, at which the certain phase of the lower arm is obtained from the successive recorded and read-out images. Therefore, the speed at which the person to be examined moves the lower arm is detected from the successive recorded and read-out images, and the deviation in phase due to the speed of the movement of the lower arm is calculated previously in accordance with the detected speed. The actual phase is presumed in accordance with the calculated deviation in phase due to the speed of the movement of the lower arm. Also, a time lag occurs between when the radiation image recording and read-out apparatus 2 receives the instruction for the ordinary image recording and read-out operations and when an x-ray source produces the x-rays. Therefore, the instruction for the ordinary image recording and read-out operations is given to the radiation image recording and read-out apparatus 2 with the aforesaid time lag being taken into consideration.

In the embodiment described above, the preliminary image recording and read-out operations are performed, and the image of the arm with the maximum displacement and the image of the arm with the minimum displacement are thereby acquired. Alternatively, image signals representing the image of the arm with the maximum displacement and the image of the arm with the minimum displacement, which images have been acquired in the past, may be read into the storage means 31.

The image of the arm with the maximum displacement and the image of the arm with the minimum displacement, which images have been acquired in the past, often include deviations in position and size of the arm with respect to the successive recorded and read-out images, which are currently acquired. Therefore, several feature points, such as the positions of the elbow, may be detected, and position matching processing may be performed with warping of the image of the arm with the maximum displacement and the image of the arm with the minimum displacement, which images have been acquired in the past, such that the positions of the image of the arm with the maximum displacement and the image of the arm with the minimum displacement, which images have been acquired in the past, may coincide with the positions of the successive recorded and read-out images. Thereafter, by use of the image of the arm with the maximum displacement and the image of the arm with the minimum displacement, which images have been subjected to the position matching processing, the phases of the lower arm may be calculated from the successive recorded and read-out images, and the timing with which the ordinary image recording operation with the ordinary radiation dose is to be performed may thus be set.

Also, in the embodiment described above, the phases of the lower arm are calculated with the maximum displacement and the minimum displacement taken as the reference displacements. However, in the cases of a disease concerning the joint, it often occurs that the patient is not capable of moving the joint sufficiently due to a pain, and the image of the arm with the maximum displacement and the image of the arm with the minimum displacement are not capable of being recorded. In such cases, the phases of the lower arm, which phases are outside the range of the phases capable of being detected from the successive recorded and read-out images, may be calculated with extrapolating operations. In this manner, the state at the time of recovery from the disease and the degree of recovery from the disease are capable of being presumed, and recuperation seeing is capable of being made.

Figure 5:
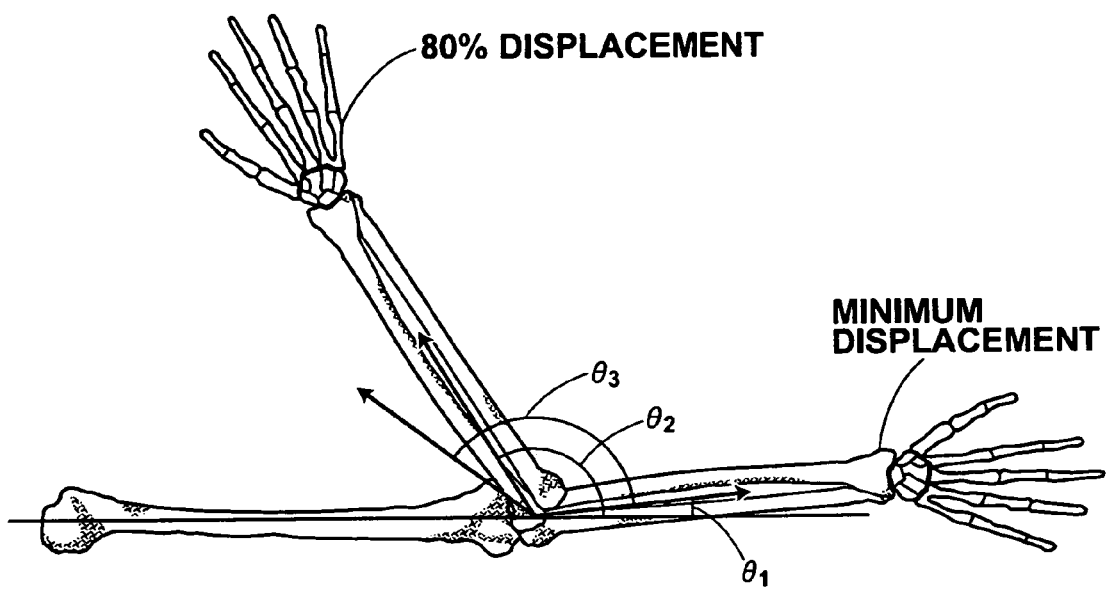
FIG. 5 is an explanatory view showing how a phase of the arm is calculated with an extrapolating operation.

Specifically, for example, in cases where the image of the arm with the minimum displacement is capable of being recorded, and an image of the arm with a displacement larger than approximately 80% is not capable of being recorded, a direction $\theta 3$ with a 90% displacement may be calculated with the extrapolating operation from the image of the arm with the minimum displacement and the image of the arm with the 80% displacement. As illustrated in FIG. 5, in cases where the direction of the lower arm with the minimum displacement is represented by $\theta 1$, and the direction of the lower arm with the 80% displacement is represented by $\theta 2$, the direction $\theta 3$ with the 90% displacement may be calculated with the formula shown below.

$$\theta 3 = 9/8 \times \theta 2 - 1/8 \times \theta 1$$

In cases where an instruction is given by the operator such that the ordinary image recording operation with the ordinary radiation dose is to be performed at the time of the 90% displacement, the ordinary image recording and read-out instructing means 34 gives the instruction for the ordinary image recording operation with the ordinary radiation dose to the radiation image recording and read-out apparatus 2 when the direction of the lower arm, which direction is obtained from one of the successive recorded and read-out images, coincides with the direction $\theta 03$ having been calculated with the formula shown above.

Figure 6:
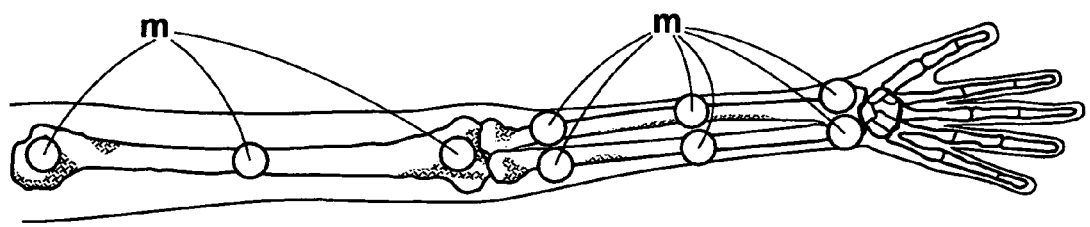
FIG. 6 is an explanatory view showing an example of an arm provided with markers.

Further, in the embodiment described above, the edges of the bone image patterns of the arm are detected, and the phases of the lower arm are thereby calculated. Alternatively, as illustrated in FIG. 6, a plurality of markers m, m, . . . , which have predetermined X-ray absorption characteristics such that the marker image patterns are recorded with contrast different from the contrast of human tissues, may be attached to the object, and the movement of the object, such as the arm, may be detected in accordance with the marker image patterns.

As the markers m, m, . . . , pieces of a metal, such as lead, may be employed. Alternatively, as the markers m, m, . . . , fine vessels containing a marker material (e.g., a liquid, such as water or an oil) may be employed. (Examples of the marker materials are described in, for example, PCT Japanese Publication No. 8(1996)-506744.) Each of the markers m, m, . . . should preferably have a shape, such as a regular circle or a rectangle, which will not exist at the object sites. In such cases, the marker image patterns are capable of being detected easily from the recorded images. Also, with the technique wherein the markers, and the like, are attached to the predetermined sites for the image recording operation, in cases where the images having been acquired in the past are utilized as the reference images, the processing, such as the warping, is capable of being performed easily.

In the embodiment described above, the lower arm is moved, and the ordinary image recording and read-out operations are performed at the time at which the phase of the lower arm coincides with the predetermined phase. As a different embodiment, the ordinary image recording and read-out operations may be performed at the time at which the phase of the heart coincides with a predetermined phase. The different embodiment will be described hereinbelow.

Specifically, firstly, the preliminary image recording and read-out operations are performed on the heart. The preliminary image recording operations are performed successively by use of a low radiation dose. Also, an image of a minimum systolic phase of the heart, an image of a maximum diastolic phase of the heart, and an image of a subsequent minimum systolic phase of the heart are selected from the successive recorded and read-out images, which have been obtained from the preliminary image recording and read-out operations. The thus selected three images are utilized as the reference images for the calculation of the phases of the heart. Heart diseases may be classified into the heart diseases, which have the characteristics such that an abnormality appears during the systolic period of an atrium, and the heart diseases, which have the characteristics such that an abnormality appears during the diastolic period of the atrium. Examples of the heart diseases, which have the characteristics such that an abnormality appears during the systolic period (i.e., the period from the maximum diastolic phase to the minimum systolic phase), include a hyperpiesia, an aortic stenosis, a hypertrophic cardiomyopathy, a mitral stenosis, and a constrictive pericarditis. Examples of the heart diseases, which have the characteristics such that an abnormality appears during the diastolic period (i.e., the period from the minimum systolic phase to the maximum diastolic phase), include a congestive heart failure, an atrial septal defect, a tricuspid insufficiency, and a pulmonary hyperpiesia. Diagnoses of the abnormalities described above have heretofore been made through the seeing of an inherent wave form, which appears during the systolic period or the diastolic period, by use of an apexcardiogram representing the results of measurement of vibrations of the frontal chest wall accompanying the movement of the apex of the heart. In cases where the shape of the heart is capable of being seen and utilized for the diagnosis together with the apexcardiogram, the diagnosis becomes capable of being made more accurately.

Figure 7:
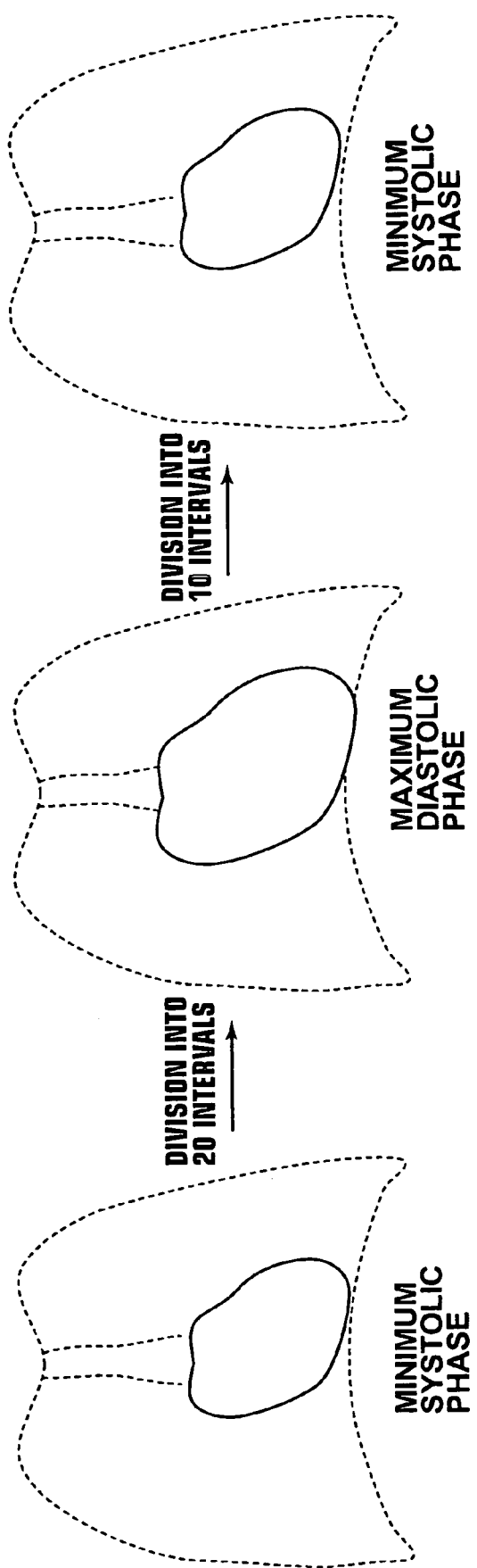
FIG. 7 is an explanatory view showing intervals for instructions of timing of heart image recording operations.
Figure 8:
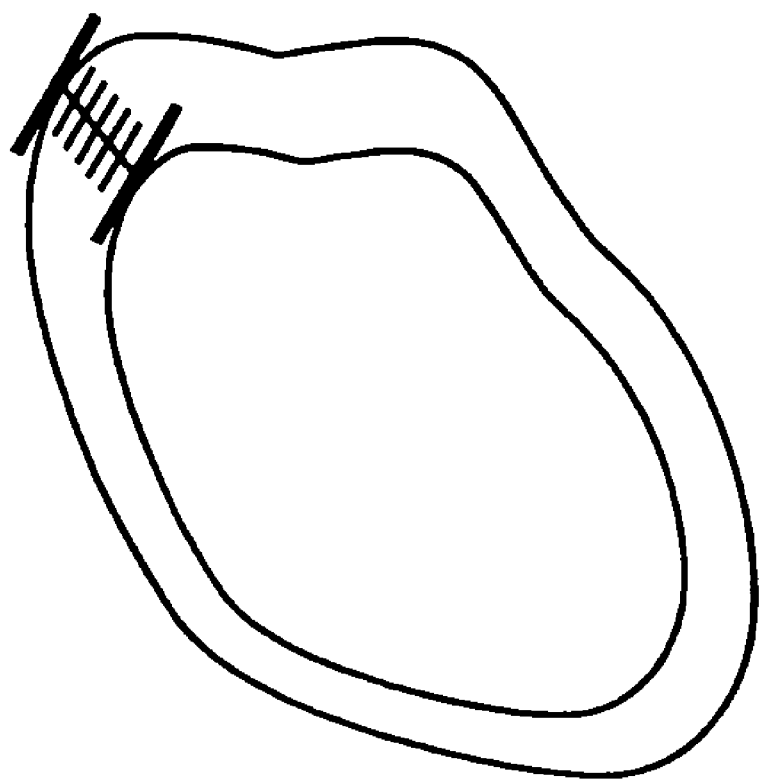
FIG. 8 is an explanatory view showing how a phase of the heart is calculated.

Therefore, by way of example, in the cases of the heart diseases, which have the characteristics such that an abnormality appears during the diastolic period, as illustrated in FIG. 7, the region from the minimum systolic phase to the maximum diastolic phase is divided into 20 intervals, and the region from the maximum diastolic phase to the minimum systolic phase is divided into 10 intervals. More specifically, as illustrated in FIG. 8, an edge of the image pattern of the right atrium is extracted, and corresponding positions are detected from the reference images. Also, the corresponding positions in the reference image of the minimum systolic phase of the heart and the reference image of the maximum diastolic phase of the heart are connected with a line. Further, in the cases of the region from the minimum systolic phase to the maximum diastolic phase, the connecting line is divided into the 20 intervals. In the cases of the region from the maximum diastolic phase to the minimum systolic phase, the connecting line is divided into the 10 intervals. The phase detection is made in accordance with an interval, at which the edge of the image pattern of the right atrium appears. The ordinary image recording operation with the ordinary radiation dose is performed at the time at which the detected phase coincides a predetermined phase.

In the embodiments described above, the radiation image recording and read-out system 1 is constituted of the radiation image recording and read-out apparatus 2 and the computer 3. Alternatively, the radiation image recording and read-out apparatus 2 may be provided with the functions of the computer 3.

Also, a computer program provided with the functions of the computer described above may be installed in a computer via a CD-ROM or a network.

With the embodiments described above, the successive image recording and read-out operations are performed on the object, such as the arm, whose phase is varying within the predetermined variation range. Also, the phase of the object with respect to each of the successive recorded and read-out images is detected. Further, the ordinary image recording and read-out operations are performed on the object at the time, at which the detected phase of the object coincides with the desired phase of the object. Therefore, the ordinary image recording operation with the ordinary radiation dose is capable of being performed at the time at which the state of the object coincides with the desired state to be seen.

What is claimed is:

1. A radiation image recording and read-out system, comprising:
   i) image recording and read-out means for performing radiation image recording and read-out operations on an object, whose phase varies within a predetermined variation range,
   ii) storage means for storing reference image signals, which represent at least two reference images of different phases of the object, the at least two reference images of the different phases of the object having been acquired with the radiation image recording and read-out operations performed on the object, whose phase varies within the predetermined variation range,
   iii) successive image recording and read-out instructing means for giving an instruction to the image recording and read-out means such that the image recording and read-out means performs successive image recording and read-out operations on the object, whose phase is varying within the predetermined variation range, the successive image recording operations being performed by use of a low radiation dose and at predetermined time intervals, a plurality of successive recorded and read-out images being acquired from the successive image recording and read-out operations,
   iv) phase detecting means for detecting the phase of the object with respect to each of the successive recorded and read-out images, which have been acquired with the image recording and read-out means and in accordance with the instruction given by the successive image recording and read-out instructing means, the phase detection being made in accordance with the reference images of the different phases of the object, and
   v) ordinary image recording and read-out instructing means for giving an instruction to the image recording and read-out means at the time, at which the detected phase of the object having been detected by the phase detecting means coincides with a desired phase of the object, such that the image recording and read-out means performs ordinary image recording and read-out operations on the object, the ordinary image recording operation being performed by use of an ordinary radiation dose.

2. A radiation image recording and read-out system as defined in claim 1 wherein the reference images of the different phases of the object are the images of a maximum displacement and a minimum displacement within the predetermined variation range.

3. A radiation image recording and read-out system as defined in claim 2 wherein the object is provided with markers having predetermined radiation absorbing characteristics, and
   the phase detecting means makes the phase detection in accordance with positions of marker image patterns, which are embedded in the reference images and the successive recorded and read-out images.

4. A radiation image recording and read-out system as defined in claim 1 wherein the object is provided with markers having predetermined radiation absorbing characteristics, and
   the phase detecting means makes the phase detection in accordance with positions of marker image patterns, which are embedded in the reference images and the successive recorded and read-out images.

5. A computer program product, including a computer readable medium, said medium comprising the procedures for causing a computer to function as:
   i) storage means for storing reference image signals, which represent at least two reference images of different phases of an object, the at least two reference images of the different phases of the object having been acquired with radiation image recording and read-out operations performed by image recording and read-out means and on the object, whose phase varies within a predetermined variation range,
   ii) successive image recording and read-out instructing means for giving an instruction to the image recording and read-out means such that the image recording and read-out means performs successive image recording and read-out operations on the object, whose phase is varying within the predetermined variation range, the successive image recording operations being performed by use of a low radiation dose and at predetermined time intervals, a plurality of successive recorded and read-out images being acquired from the successive image recording and read-out operations,
   iii) phase detecting means for detecting the phase of the object with respect to each of the successive recorded and read-out images, which have been acquired with the image recording and read-out means and in accordance with the instruction given by the successive image recording and read-out instructing means, the phase detection being made in accordance with the reference images of the different phases of the object, and iv) ordinary image recording and read-out instructing means for giving an instruction to the image recording and read-out means at the time, at which the detected phase of the object having been detected by the phase detecting means coincides with a desired phase of the object, such that the image recording and read-out means performs ordinary image recording and read-out operations on the object, the ordinary image recording operation being performed by use of an ordinary radiation dose.

* * * * *